United States Patent Office 3,116,338
Patented Dec. 31, 1963

3,116,338
DEHYDROGENATION OF HYDROCARBONS
Howard R. Guest, Charleston, and Ben W. Kiff, Ona, W. Va., assignors to Union Carbide Corporation, a corporation of New York
No Drawing. Filed July 12, 1960, Ser. No. 42,219
11 Claims. (Cl. 260—666)

This invention relates to a process for the dehydrogenation of aliphatic hydrocarbons. In a particular aspect this invention relates to a process for the oxidative dehydrogenation of saturated cycloaliphatic hydrocarbons to produce the corresponding cyclic olefin. In a more particular aspect, this invention relates to the oxidative dehydrogenation of cyclohexane to cyclohexene.

The dehydrogenation of, for example, saturated cycloaliphatic hydrocarbons having six-membered rings into the corresponding olefins has been difficult to perform in good yield because of the propensity of the reaction to proceed through the monounsaturated olefin to form the corresponding aromatic compound. For example, U.S. Patent No. 2,661,380 discloses the preparation of cyclohexene by the oxidative dehydrogenation of cyclohexane in the presence of a tellurium oxide catalyst, with the highest conversion to cyclohexene being 7 percent per pass, and with significant quantities of benzene (up to 4 percent per pass) being formed at the same time. U.S. Patent No. 2,692,292 discloses the oxidative dehydrogenation of cyclohexane to cyclohexene at elevated temperatures without use of catalysts, wherein the conversion of cyclohexane is up to 8 percent per pass, but with only about 40 percent of the converted product being cyclohexene. It is further specified in said patent that the reactor be constructed of a non-metallic material. In addition, reaction of a hydrocarbon with oxygen frequently leads to production of carbon dioxide and water, or production of oxygenated derivatives, or both, rather than dehydrogenation to the corresponding olefin.

Using cyclohexane for illustration, the reaction of saturated cycloaliphatic hydrocarbons with oxygen can result in several different products. For example, complete oxidation produces carbon dioxide and water, as illustrated by the equation:

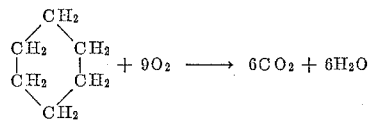

Dehydrogenation to the corresponding olefin can also take place, as shown in the following equation:

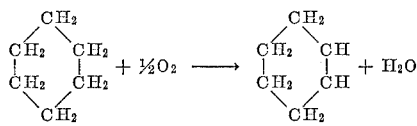

Frequently, the dehydrogenation does not stop with the olefin when a saturated cycloaliphatic hydrocarbon having a six-membered ring is employed, but proceeds to the corresponding aromatic compound. This is exemplified by the equation below:

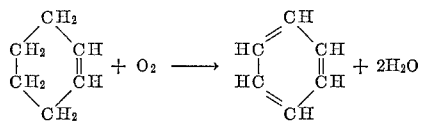

This invention provides a process whereby saturated cycloaliphatic hydrocarbons can be dehydrogenated to the corresponding cyclic olefin in good yield, with only a minimum of undesired side reaction.

Broadly stated, the invention is a process which comprises contacting a mixture comprising (a) a saturated cycloaliphatic hydrocarbon, (b) an oxygen-containing gas, and (c) an oxidation-retarding agent, with a catalyst, for a period of time sufficient to remove two hydrogen atoms from adjacent carbon atoms in the cycloaliphatic ring, the oxidation-retarding agent and catalyst being more fully described below.

It is an object of this invention to provide a process for the dehydrogenation of aliphatic hydrocarbons. It is another object of this invention to provide a process for the oxidative dehydrogenation of saturated cycloaliphatic hydrocarbons. It is a further object of this invention to provide a process for the oxidative dehydrogenation of saturated cycloaliphatic hydrocarbons to the corresponding cyclic olefin. A still further object of the invention is to provide a process for the oxidative dehydrogenation of cyclohexane to cyclohexene. Other objects of the invention will be apparent to those skilled in the art upon an examination of the detailed description below.

The saturated cycloaliphatic hydrocarbons which are contemplated for use in the process of this invention are the saturated cycloaliphatic hydrocarbons having a five to seven-membered ring, and their lower alkyl-substituted homologues. Exemplary saturated cycloaliphatic hydrocarbons include cyclopentane, cyclohexane, cycloheptane, methylcyclopentane, methylcyclohexane, methylcycloheptane, ethylcyclohexane, propylcyclohexane, butylcyclohexane, and the like. Cyclohexane, and the lower alkyl-substituents of cyclohexane, are preferred.

The invention includes in the reaction mixture an oxygen-containing gas, such as air, in such proportions that from about 0.1 mole, per mole of hydrocarbon, and lower, to about 5 moles, per mole of hydrocarbon, and higher, of oxygen are present. The preferred molar proportion of oxygen to hydrocarbon in the reaction mixture is from about 0.2 mole of oxygen to about 1 mole of oxygen, per mole of hydrocarbon. If desired, the oxygen can be supplied to the reaction mixture in the undiluted state, but air is the preferred source of oxygen since it is the most convenient.

Essential to this invention is the presence in the reaction mixture of a small amount of an oxidation-retarding agent. The oxidation-retarding agents apparently act in some manner to retard the activity of the catalyst so that undesired side reactions, such as oxidation to carbon dioxide and dehydrogenation to aromatic compounds, are suppressed. It is probable that said oxidation-retarding agents achieve this result by being selectively adsorbed on the surface of the catalyst and thereby limiting the activity of said catalyst. However, the exact mechanism by which the oxidation-retarding agents funtion is unknown, and it is to be understood that this invention is not limited by or restricted to any theory of action expressed herein.

Among the substances that have been found to be effective as oxidation-retarding agents are the following five classes of compounds:

(I) Organic silicon halides
(II) Lower alkyl halides
(III) Lower alkyl phosphites
(IV) Volatile inorganic compounds containing phosphorus and chlorine
(V) Volatile inorganic compounds containing sulfur and oxygen.

The organic silicon halides are those compounds represented by the formula:

$$R_nSiX_{4-n}$$ 

wherein R represents a member selected from the group consisting of alkyl radicals and aryl radicals, $n$ is a whole positive integer falling in the range of from 1 to 3, and X represents a halogen atom. Preferred alkyl radicals are the lower alkyl radicals having from 1 to about 4 carbon atoms. Highly preferred alkyl radicals are the methyl radicals. Preferred aryl radicals are the phenyl radicals. The preferred halogen is chlorine. Examples of organic silicon halides include methyltrichlorosilane, dimethyldichlorosilane, trimethylchlorosilane, methylphenyldichlorosilane, phenyltrichlorosilane, diphenyldichlorosilane, triphenylchlorosilane, ethyltrichlorosilane, tolyltrichlorosilane, propyltrichlorosilane, and the like.

The lower alkyl halides are those compounds represented by the formula:

$$C_pH_{2p+2-r}X_r$$

wherein $p$ is a whole positive integer falling in the range of from 1 to 4, $r$ is a whole positive integer falling in the range of from 1 to $2p+2$, and X represents a halogen atom. The preferred lower alkyl halides are the chlorine-substituted methanes and ethanes having from 1 to 4 chlorine atoms. Exemplary lower alkyl halides include methyl chloride, dichloromethane, chloroform, carbon tetrachloride, methyl bromide, dibromomethane, bromoform, methyl iodide, diiodomethane ethyl chloride, ethylene dichloride, ethyl bromide, ethylene dibromide, ethyl iodide, propyl chloride, 1,2-dichlolobutane, and the like.

The lower alkyl phosphites are those compounds represented by the formula $$P(OR)_3$$

wherein R represents a lower alkyl radical having from 1 to 4 carbon atoms. Examples of lower alkyl phosphites that are contemplated by this invention include trimethyl phosphite, triethyl phosphite, triisopropyl phosphite, tripropyl phosphite, tributyl phosphite, and the like. Preferred members are triethyl phosphite and triisopropyl phosphite.

The volatile inorganic compounds containing phosphorus and chlorine are those inorganic compounds that have boiling points below about 200° C. at atmospheric pressure and which contain both phosphorus and chlorine. Exemplary members include phosphorus oxychloride, phosphorus dichloride, phosphorus trichloride, phosphonium chloride, phosphorus oxybromide dichloride, and the like. Preferred is phosphorus trichloride.

The volatile inorganic compounds containing oxygen and sulfur are those inorganic compounds that have boiling points below about 100° C. at atmospheric pressure and which contain both oxygen and sulfur. Examples include sulfur dioxide sulfur trioxide, thionyl chloride, sulfuryl chloride, thionyl chloride fluoride, and the like. Preferred are the volatile inorganic compounds containing oxygen and sulfur which have chlorine as a third element. Highly preferred is thionyl chloride.

The oxidation-retarding agent is preferably employed in small amounts. The beneficial effects are obtained when said agent is employed in amounts ranging from about 3 parts per million, and lower, to about 1000 parts per million, and higher, based on the total volume of gases comprising the reactants. The preferred amount of oxidation-retarding agent is from about 5 parts per million to about 100 parts per million, based on the total volume of gases comprising the reactants. However, the concentration will be governed, to an extent, by variables such as temperature, pressure, reactants, catalyst, and surface area of catalyst.

The catalysts that can be employed in the process of this invention fall into four classes:
(1) The group IB metals of the periodic table having atomic weights of less than 110,
(2) Silver oxide,
(3) Cupric oxide, and
(4) A mixture of silver oxide and an alkaline earth metal oxide.

Examples of catalysts that can be employed include silver, copper, silver oxide, cupric oxide, silver oxide/calcium oxide, silver oxide/barium oxide, silver oxide/strontium oxide, and the like. The preferred catalysts are silver, silver oxide, cupric oxide, and silver oxide/barium oxide mixture.

Where the catalyst is a mixture of silver oxide and an alkaline earth metal oxide, the proportion of silver oxide can vary from about 30 percent by weight to about 99 percent by weight, based on the total weight of silver oxide and alkaline earth metal oxide. The preferred proportions are from about 60 percent by weight of silver oxide to about 95 percent by weight of silver oxide, based on the total weight of silver oxide and alkaline earth metal oxide.

It is normally the practice that, when employing a metal oxide or oxides as the catalyst, the catalyst bed comprises said metal oxide deposited on a catalyst support. Such supports include, for example, silicon carbide, sintered alumina, pumice, pelleted silica and the like. It is preferable when the catalyst is deposited on such a support that the metal oxide catalyst(s) constitute from about 2 percent to about 30 percent, by weight, of the catalyst bed. The balance of the catalyst bed will consist essentially of the support.

When metallic silver or copper is employed as the catalyst, it is preferable that said catalyst be in finely divided form in order to facilitate contact of the reagents with the catalysts.

The reaction time, that is, the contact time of the reactants with the catalyst, is a period of time sufficient to effect the removal of two hydrogen atoms on adjacent carbon atoms that are located in the cycloaliphatic ring of the saturated cycloaliphatic hydrocarbon. Thus, the reaction is continued for a period of time sufficient to dehydrogenate the saturated cycloaliphatic hydrocarbon to produce the corresponding cyclic olefin. For best efficiency, it is preferable that said contact time be relatively short. For example, a suitable contact time is from about 0.1 seconds, and lower, to about 5 seconds, and higher. The preferred contact time is from about 0.15 second to about 2 seconds. Although the invention is still operative at contact times above and below the limits set forth hereinabove, if the contact time is too short, the proportion of hydrocarbon that is reacted will start to diminish, and if the contact time is too long, excessive oxidation can occur.

The reaction is carried out at an elevated temperature sufficient to maintain the reactants in the vapor state. The exact temperature employed will depend, in part, on factors such as nature of the reactants, catalyst, pressure, and the like. A suitable temperature range is from about 250° C. to about 550° C. The preferred temperature range is from about 300° C. to about 500° C. Highly preferred is a temperature range of from about 350° C. to about 450° C.

Normally the reaction is carried out at essentially atmospheric pressure. However, sub-atmospheric or super-atmospheric pressure can be employed if desired.

If desired, the reactants can be diluted with materials that are inert in the reaction. Examples of such materials include nitrogen, helium, carbon dioxide, water vapor, and the like. The effect of dilution is to reduce very slightly the incidence of side reactions leading to production of, for example, carbon dioxide and aromatic compounds.

The cycloaliphaitc hydrocarbon feed and the oxygen-containing gas can be introduced into the reaction zone by conventional methods. Several different methods can be employed to add the oxidation-retarding agent to the reaction mixture. For example, methods which have been found effective include (a) dissolving the oxidation-retarding agent in the hydrocarbon feed, and (b) bubbling a slow stream of an inert gas (nitrogen, for example) through a vessel containing oxidation-retarding agent, and then allowing the inert gas to enter into the gas stream inlet of the reactor. In method (b), only the small amount of oxidation-retarding agent that volatilizes in the slow stream of the inert gas is added to the reaction mixture; thus it is evident that a very small quantity of said agent will produce the desired effect.

An important factor to be considered in determining the throughput rate of the reactants is the contact time that it is desired to maintain between the reactants and the catalyst bed. As was described above, said contact time can vary from about 0.1 second, and lower, to about 5 seconds, and higher. As a guide to determining the throughput rate, when, for example, a tubular catalytic reactor of conventional design is employed in the process of this invention, the throughput rate can be varied from about 0.20 gram-moles of saturated cycloaliphatic hydrocarbon per hour per 100 cubic centimeters of catalyst bed to about 25 gram-moles of saturated cycloaliphatic hydrocarbon per hour per 100 cubic centimeters of catalyst bed.

The addition to the dehydrogenation reaction which occurs in the process of this invention, a variety of other reactions can occur which produce valuable oxygenated products. This does not represent a loss in efficiency, since many of these products are of commercial value for sale as such or as intermediates for the preparation of other valuable compounds. When cyclohexane, for example, is dehydrogenated according to the process of this invention, the products include cyclohexene, cycloehxanol, valeraldehyde, hexaldehyde, cyclohexanone and crotonaldehyde, as well as small amounts of carbon dioxide, carbon monoxide, methane, ethane, and the like.

The products can be recovered and separated by methods which are well known in the art, and include, for example, fractional distillation. One of the advantages of the process of this invention when it is employed, for example, to produce cyclohexene from cyclohexane is that, at most, only insignificant quantities of benzene are formed. In prior art methods of producing cyclohexene, in which major amounts of benzene are produced concurrently with the cyclohexene, the separation of benzene from cyclohexene and unreacted cyclohexane is a very difficult problem that is not present in the process of this invention. After separation of the products, the unreacted cycloaliphatic hydrocarbon can be recycled over the catalyst.

The utility of this invention is readily apparent to one skilled in the art. It can be used, for example, to produce cyclohexene. Cyclohexene can be employed as an intermediate in the preparation of cyclohexanol, cyclohexanone, adipic acid, 1,2-cyclohexanediol, cyclohexane-carboxaldehyde, cyclohexane methanol, and the like.

The invention is preferably carried out as a continuous process, since a vapor state process is normally more economically carried out continuously.

Modifications of the invention will be apparent to those skilled in the art, and are included within the invention as defined by the claims.

The following, non-limiting examples are illustrative of the invention.

*Example 1*

The reactor used for this experiment was a stainless steel tube, 1 inch in diameter and 4 feet long. It was surrounded by a jacket containing a molten salt mixture which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.3 moles per hour, and the molar ratio of cyclohexane to molecular oxygen was 1.34:1.0.

No oxidation-retarding agent was used in this experiment.

The catalyst bed consisted of 200 cubic centimeters of 14.8 percent by weight of silver oxide and 1.44 percent by weight of barium oxide, deposited on Alundum spheres (a form of sintered alumina, made by the Norton Company). The temperature of the catalyst bed was maintained at 395–416° C. during the reaction, and the contact time with the catalyst was 2 seconds.

The product was analyzed by means of a gas chromatograph. It was found to contain as much as 10 percent carbon dioxide, with only traces of cyclohexene being formed.

*Example 2*

The reactor used for this experiment was a stainless steel tube, 1 inch in diameter and 4 feet long. It was surrounded by a jacket containing a molten salt mixture which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.3 moles per hour, and the molar ratio of cyclohexane to molecular oxygen was 1.34:1.0.

The oxidation-retarding agent was thionyl chloride, and it was added to the reaction mixture by bubbling nitrogen through a test tube half filled with thionyl chloride at the rate of 200 bubbles per minute, and then allowing the nitrogen to enter into the gas stream inlet of the reactor.

The catalyst bed consisted of 200 cubic centimeters of 14.8 percent by weight of silver oxide and 1.44 percent by weight of barium oxide, deposited on Alundum spheres (a form of sintered alumina, made by the Norton Company). The temperature of the catalyst bed was maintained at 395–416° C. during the reaction, and the contact time with the catalyst was 2 seconds.

The liquid product was condensed and analyzed by means of a gas chromatograph. It was found to contain 90 percent by weight of unreacted cyclohexane and 9.3 percent by weight of cyclohexene.

*Example 3*

The reactor used for this experiment was a stainless steel tube, 1 inch in diameter and 4 feet long. It was surrounded by a jacket containing a molten salt mixture which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.83 moles per hour, and the molar ratio of cyclohexane to molecular oxygen was 2.2:1.0.

The oxidation-retarding agent was ethylene dichloride, and it was added to the reaction mixture by bubbling nitrogen through a test tube half filled with ethylene dichloride at the rate of 120 bubbles per minute, and then allowing the nitrogen to enter into the gas stream inlet of the reactor.

The catalyst bed consisted of 200 cubic centimeters of 14.8 percent by weight of silver oxide and 1.44 percent by weight of barium oxide, deposited on Alundum spheres (a form of sintered alumina, made by the Norton Company). The temperature of the catalyst bed was maintained at 389–401° C. during the reaction, and the contact time with the catalyst was 2.2 seconds.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and a trace of benzene. The effluent gas contained traces of hydrocarbons such as methane, ethane, and propane in addition to carbon monoxide, carbon dioxide and some unreacted oxygen.

The total amount of cyclohexane converted was 15 percent.

The total amount of cyclohexane converted to cyclohexene was 9.75 percent.

The total amount of cyclohexane converted to commercially valuable liquid products was 11.4 percent.

The total amount of cyclohexane converted to gases and non-valuable liquid products such as benzene was 3.6 percent.

*Example 4*

The reactor used for this experiment was a stainless steel tube, 1 inch in diameter and 4 feet long. It was surrounded by a jacket containing a molten salt mixture which was heated electrically. Cyclohexane was fed to the reactor from a calibrated reservoir by means of a pump which was capable of delivering small quantities of liquid at a steady rate. Air was used as a source of oxygen, and was admitted to the reactor through conventional metering devices. The rate of feed of the cyclohexane was 1.83 moles per hour, and the molar ratio of cyclohexane to molecular oxygen was 2.2:1.0.

The oxidation-retarding agent was dimethyldichlorosilane, and it was added to the reaction mixture by bubbling nitrogen through a test tube half filled with dimethyldichlorosilane at the rate of 50 bubbles per minute, and then allowing the nitrogen to enter into the gas stream inlet of the reactor.

The catalyst bed consisted of 235 cubic centimeters of 14.26 percent by weight of silver oxide and 1.22 percent by weight of barium oxide, deposited on Alundum spheres (a form of sintered alumina, made by the Norton Company). The temperature of the catalyst bed was maintained at 405° C. during the reaction, and the contact time with the catalyst was 2.15 seconds.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and no benzene. The effluent gas contained traces of hydrocarbons such as methane, ethane, and propane in addition to carbon monoxide, carbon dioxide, and some unreacted oxygen.

The total amount of cyclohexane converted was 18.7 percent.

The total amount of cyclohexane converted to cyclohexene was 8.4 percent.

The total amount of cyclohexane converted to valuable liquid products was 14.6 percent.

The total amount of cyclohexane converted to gases and non-valuable liquid products was 4.1 percent.

*Example 5*

The reactor used for this experiment was a stainless steel tube, 1 inch in dimaeter and 4 feet long. It was surrounded by a jacket containing a molten salt mixture which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.83 moles per hour, and the molar ratio of cyclohexane to molecular oxygen was 4.4:1.0.

The oxidation-retarding agent was dimethyldichlorosilane, and it was added to the reaction mixture by bubbling nitrogen through a test tube half filled with dimethyldichlorosilane at the rate of 52 bubbles per minute, and then allowing the nitrogen to enter into the gas stream inlet of the reactor.

The catalyst bed consisted of 200 cubic centimeters of 14.8 percent by weight of silver oxide and 1.44 percent by weight of barium oxide, deposited on Alundum spheres (a form of sintered alumina, made by the Norton Company). The temperature of the catalyst bed was maintained at 365° C. during the reaction, and the contact time with the catalyst was 3.25 seconds.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and a trace of benzene. The effluent gas contained traces of hydrocarbons such as methane, ethane, and propane in addition to carbon monoxide, carbon dioxide and some unreacted oxygen.

The total amount of cyclohexane converted was 17.2 percent.

The total amount of cyclohexane converted to cyclohexene was 8.8 percent.

The total amount of cyclohexane converted to valuable liquid products was 13.0 percent.

The total amount of cyclohexane converted to gases and non-valuable liquid products such as benzene was 4.2 percent.

*Example 6*

The reactor used for this experiment was a stainless steel tube, 1 inch in diameter and 4 feet long. It was surrounded by a jacket containing Dowtherm which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.83 moles per hour, and the molar ratio of cyclohexane to molecular oxygen was 4.4:1.0.

The oxidation-retarding agent was dimethyldichlorosilane and it was added to the reaction mixture by bubbling nitrogen through a test tube half filled with dimethyldichlorosilane at the rate of 80 bubbles per minute, and then allowing the nitrogen to enter into the gas stream inlet of the reactor.

The catalyst bed consisted of 350 cubic centimeters of 16 percent by weight of silver oxide deposited on Aloxite (a form of sintered alumina, made by the Carborundum Company). The temperature of the catalyst bed was maintained at 340–360° C. during the reaction, and the contact time with the catalyst was 5.1 seconds.

The liquid product was condensed and analyzed by means of a gas chromatograph. It was found to contain principally unreacted cyclohexane and cyclohexene. The effluent gas contained traces of hydrocarbons in addition to carbon monoxide, carbon dioxide and some unreacted oxygen.

The total amount of cyclohexane converted was 4.0 percent.

The total amount of cyclohexane converted to cyclohexene was 2.9 percent.

The total amount of cyclohexane converted to valuable liquid products was 2.94 percent.

The total amount of cyclohexane converted to gases and non-valuable liquid products such as benzene was 1.06 percent.

*Example 7*

The reactor used for this experiment was a stainless steel tube, 1 inch in diameter and 4 feet long. It was surrounded by a jacket containing a molten salt mixture which was heated electrically. Cyclohexane fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 1.3 moles per hour, and the molar ratio of cyclohexane to molecular oxygen was 0.9:1.0.

The oxidation-retarding agent was dimethyldichlorosilane, and it was added to the reaction mixture by bubbling nitrogen through a test tube half filled with dimethyldichlorosilane at the rate of 40 bubbles per minute, and then allowing the nitrogen to enter into the gas stream inlet of the reactor.

The catalyst bed consisted of 200 cubic centimers of 14.8 percent by weight of silver oxide and 1.44 percent by weight of barium oxide, deposited on Alundum spheres (a form of sintered alumina, made by the Norton Company). The temperature of the catalyst bed was maintained at 360–370° C. during the reaction, and the contact time with the catalyst was 1.6 seconds.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and a trace of benzene. The effluent gas contained traces of hydrocarbons such as methane, ethane, and propane in addition to carbon monoxide, carbon dioxide and some unreacted oxygen.

The total amount of cyclohexane converted was 28.0 percent.

The total amount of cyclohexane converted to cyclohexene was 15.1 percent.

The total amount of cyclohexane converted to valuable liquid products was 21.0 percent.

The total amount of cyclohexane converted to gases and non-valuable liquid products such as benzene was 7.0 percent.

*Example 8*

The reactor used for this experiment was a stainless steel tube, 1 inch in diameter and 4 feet long. It was surrounded by jacket containing a molten salt mixture which was heated electrically. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 2.02 moles per hour, and the molar ratio of cyclohexane to molecular oxygen was 2.28:1.0.

The oxidation-retarding agent was dimethyldichlorosilane, and it was added to the reaction mixture by bubbling nitrogen through a test tube half filled with dimethyldichlorosilane at the rate of 140 bubbles per minute, and then allowing the nitrogen to enter into the gas stream inlet of the reactor.

The catalyst bed consisted of 100 grams of 40 mesh silver gauze. The temperature of the catalyst bed was maintained at 420–425° C. during the reaction, and the contact time with the catalyst was 1.05 seconds.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and a trace of benzene. The effluent gas contained traces of hydrocarbons such as methane, ethane, and propane in addition to carbon monoxide, carbon dioxide and some unreacted oxygen.

The total amount of cyclohexane converted was 20.8 percent.

The total amount of cyclohexane converted to cyclohexene was 10.2 percent.

The total amount of cyclohexane converted to valuable liquid products was 16.7 percent.

The total amount of cyclohexane converted to gases and non-valuable liquid products such as benzene was 4.1 percent.

*Example 9*

The reactor used for this experiment was a stainless steel tube, 1 inch in diameter and 8 inches long. It was heated electrically by a direct winding. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 2.03 moles per hour, and the molar ratio of cyclohexane to molecular oxygen was 1.25:1.0.

The oxidation-retarding agent was dimethyldichlorosilane, and it was added to the reaction mixture by bubbling nitrogen through a test tube half filled with dimethyldichlorosilane at the rate of 50 bubbles per minute, and then allowing the nitrogen to enter into the gas stream inlet of the reactor.

The catalyst bed consisted of 40 cubic centimeters of 14.26 percent by weight of silver oxide and 1.22 percent by weight of barium oxide, deposited on Alundum spheres (a form of sintered alumina, made by the Norton Company). The temperature of the catalyst bed was maintained at 410° C. during the reaction, and the contact time with the catalyst was 0.25 second.

The liquid product was condensed and analyzed by means of a gas chromatograph. It was found to contain the following: unreacted cyclohexane, cyclohexene, crotonaldehyde, valeraldehyde, cyclohexanol, cyclohexanone, and no benzene. The effluent gas contained traces of hydrocarbons such as methane, ethane, and propane in addition to carbon monoxide, carbon dioxide and some unreacted oxygen.

The total amount of cyclohexane converted was 13.75 percent.

The total amount of cyclohexane converted to cyclohexene was 9.6 percent.

The total amount of cyclohexane converted to valuable liquid products was 11.2 percent.

The total amount of cyclohexane converted to gases and non-valuable liquid products such as benzene was 2.55 percent.

*Example 10*

The reactor used for this experiment was a stainless steel tube, 1 inch in diameter and 8 inches long. It was heated electrically by direct windings. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 2.38 moles per hour, and the molar ratio of cyclohexane to molecular oxygen was 1.36:1.0.

The oxidation-retarding agent was dimethyldichlorosilane and it was added to the reaction mixture by bubbling nitrogen through a test tube half filled with dimethyldichlorosilane at the rate of 44 bubbles per minute, and then allowing the nitrogen to enter into the gas stream inlet of the reactor.

The catalyst bed consisted of 40 cubic centimeters of 14.26 percent by weight of silver oxide and 1.22 percent by weight of barium oxide, deposited on Alundum spheres (a form of sintered alumina, made by the Norton Company). The temperature of the catalyst bed was maintained at 405° C. during the reaction, and the contact time with the catalyst was 0.23 second.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and no benzene. The effluent gas contained traces of hydrocarbons such as methane, ethane, and propane in addition to carbon monoxide, carbon dioxide, and some unreacted oxygen.

The total amount of cyclohexane converted was 14.35 percent.

The total amount of cyclohexane converted to cyclohexene was 9.9 percent.

The total amount of cyclohexane converted to valuable liquid products was 12.5 percent.

The total amount of cyclohexane converted to gases and non-valuable liquid products such as benzene was 1.85 percent.

Example 11

The reactor used for this experiment was a stainless steel tube, 1 inch in diameter and 8 inches long. It was heated electrically by direct windings. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 3.2 moles per hour, and the molar ratio of cyclohexane to molecular oxygen was 1.83:1.0.

The oxidation-retarding agent was dimethyldichlorosilane, and it was added to the reaction mixture by bubbling nitrogen through a test tube half filled with dimethyldichlorosilane at the rate of 100 bubbles per minute, and then allowing the nitrogen to enter into the gas stream inlet of the reactor.

The catalyst bed consisted of 40 cubic centimeters of 2.0 percent by weight of cupric oxide deposited on Alundum spheres (a form of sintered alumina, made by the Norton Company). The temperature of the catalyst bed was maintained at 370° C. during the reaction, and the contact time with the catalyst was 0.25 second.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and benzene. The effluent gas contained traces of hydrocarbons such as methane, ethane, and propane in addition to carbon monoxide, carbon dioxide and some unreacted oxygen.

The total amount of cyclohexane converted was 16.0 percent.

The total amount of cyclohexane converted to cyclohexene was 8.1 percent.

The total amount of cyclohexane converted to valuable liquid products was 11.6 percent.

The total amount of cyclohexane converted to gases and nonvaluable liquid products such as benzene was 4.4 percent.

Example 12

The reactor used for this experiment was a stainless steel tube, 1 inch in diameter and 8 inches long. It was heated electrically by direct windings. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 2.04 moles per hour, and the molar ratio of cyclohexane to molecular oxygen, was 1.09:1.0.

The oxidation-retarding agent was phosphorous trichloride, and it was added to the reaction mixture by dissolving 0.05 percent by weight of phosphorus trichloride in the cyclohexane feed.

The catalyst bed consisted of 40 cubic centimeters of 14.26 percent by weight of silver oxide and 1.22 percent by weight of barium oxide, deposited on Alundum spheres (a form of sintered alumina, made by the Norton Company). The temperature of the catalyst bed was maintained at 368° C. during the reaction, and the contact time with the catalyst was 0.25 second.

The liquid product was condensed and analyzed by means of a gas chromatograph. It was found to contain the following: unreacted cyclohexane, cyclohexene, crotonaldehyde, valeraldehyde, hexaldehyde, cyclohexanol, cyclohexanone, and a trace of benzene. The effluent gas contained traces of hydrocarbons such as methane, ethane, and propane in addition to carbon monoxide, carbon dioxide and some unreacted oxygen.

The total amount of cyclohexane converted was 9.48 percent.

The total amount of cyclohexane converted to cyclohexene was 5.4 percent.

The total amount of cyclohexane converted to valuable liquid products was 7.1 percent.

The total amount of cyclohexane converted to gases and nonvaluable liquid products such as benzene was 2.38 percent.

Example 13

The reactor used for this experiment was a stainless steel tube, 1 inch in diameter and 8 inches long. It was heated electrically by direct windings. Cyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the cyclohexane was 2.02 moles per hour, and the molar ratio of cyclohexane to molecular oxygen was 1.21:1.0.

The oxidation-retarding agent was triethyl phosphite, and it was added to the reaction mixture by dissolving 0.05 percent by weight of triethyl phosphite in the cyclohexane feed.

The catalyst bed consisted of 40 cubic centimeters of 14 percent by weight of silver oxide and 1 percent by weight of barium oxide, deposited on Alundum spheres (a form of sintered alumina, made by the Norton Company). The temperature of the catalyst bed was maintained at 364–384° C. during the reaction, and the contact time with the catalyst was 0.25 second.

The liquid product was condensed and analyzed by means of a gas chromatograph. It was found to contain the following: unreacted cyclohexane, cyclohexene, crotonaldehyde, valeraldehyde, cyclohexanol, cyclohexanone, and a trace of benzene. The effluent gas contained traces of hydrocarbons such as methane, ethane, and propane in addition to carbon monoxide, carbon dioxide, and some unreacted oxygen.

The total amount of cyclohexane converted was 6.1 percent.

The total amount of cyclohexane converted to cyclohexene was 3.7 percent.

Example 14

The reactor used for this experiment was a stainless steel tube, 1 inch in diameter and 8 inches long. It was heated electrically by a direct winding. Methylcyclohexane was fed to the reactor from a calibrated reservoir by means of a pump which was capable of delivering small quantities of liquid at a steady rate. Air was used as the source of oxygen, and was admitted to the reactor through conventional metering devices. The rate of feed of the methylcyclohexane was 1.83 moles per hour, and the molar ratio of methylcyclohexane to molecular oxygen was 1.09:1.

The oxidation-retarding agent was dimethyldichlorosilane, and it was added to the reaction mixture by bubbling nitrogen through a test tube half filled with dimethyldichlorosilane at the rate of 100 bubbles per minute, and then allowing the nitrogen to enter into the gas stream inlet of the reactor.

The catalyst bed consisted of 40 cubic centimeters of 14.6 percent by weight silver oxide and 1.22 percent by weight of barium oxide deposited on Alundum spheres (a form of sintered alumina, made by the Norton Company). The temperature of the catalyst bed was maintained at 395–409° C. during the reaction.

About 10 percent of the methylcyclohexane had been converted to liquid products, of which about 40 percent was methylcyclohexene. Analysis was by gas chromatograph.

What is claimed is:

1. A process which comprises contacting a mixture comprising
   (a) a saturated cycloaliphatic hydrocarbon having a five-to-seven-membered ring,
   (b) an oxygen-containing gas, and
   (c) a member selected from the group consisting of the organic silicon halides, the lower alkyl halides, the lower alkyl phosphites, the volatile inorganic compounds containing phosphorus and chlorine, and the volatile inorganic compounds containing sulfur and oxygen; with a catalyst selected from the group consisting of copper, silver, silver oxide, cupric oxide and a mixture of silver oxide and an alkaline earth metal oxide, at a temperature sufficient to maintain said mixture in a vapor state, and for a period of time sufficient to dehydrogenate said saturated cycloaliphatic hydrocarbon to produce the corresponding cyclic olefin.

2. A process which comprises contacting a mixture comprising
   (a) cyclohexane,
   (b) an oxygen-containing gas, and
   (c) a member selected from the group consisting of the organic silicon halides, the lower alkyl halides, the lower alkyl phosphites, the volatile inorganic compounds containing phosphorus and chlorine, and the volatile inorganic compounds containing sulfur and oxygen; with a catalyst selected from the group consisting of copper, silver, silver oxide, cupric oxide and a mixture of silver oxide and an alkaline earth metal oxide, at a temperature sufficient to maintain said mixture in the vapor state, and for a period of time sufficient to produce cyclohexene.

3. The process described in claim 1 wherein said process is carried out at a temperature in the range of from about 250° C. to about 550° C. for a period of from about 0.1 second to about 5 seconds.

4. The process described in claim 2 wherein said process is carried out at a temperature in the range of from about 250° C. to about 550° C. for a period of from about 0.1 second to about 5 seconds.

5. A process which comprises contacting a mixture comprising
   (a) cyclohexane,
   (b) an oxygen-containing gas, and
   (c) a small amount of thionyl chloride, with a catalyst comprising a mixture of silver oxide and an alkaline earth metal oxide, at a temperature in the range of from about 250° C. to about 550° C., for a period of from about 0.1 second to about 5 seconds.

6. A process which comprises contacting a mixture comprising
   (a) cyclohexane,
   (b) an oxygen-containing gas, and
   (c) a small amount of ethylene chloride, with a catalyst comprising a mixture of silver oxide and an alkaline earth metal oxide, at a temperature in the range of from about 250° C. to about 550° C., for a period of from about 0.1 second to about 5 seconds.

7. A process which comprises contacting a mixture comprising
   (a) cyclohexane,
   (b) an oxygen-containing gas, and
   (c) a small amount of dimethyldichlorosilane, with a catalyst comprising a mixture of silver oxide and an alkaline earth metal oxide, at a temperature in the range of from about 250° C. to about 550° C., for a period of from about 0.1 second to about 5 seconds.

8. A process which comprises contacting a mixture comprising
   (a) cyclohexane,
   (b) an oxygen-containing gas, and
   (c) a small amount of dimethyldichlorosilane, with a catalyst selected from the group consisting of silver and copper, at a temperature in the range of from about 250° C. to about 550° C. for a period of from about 0.1 second to about 5 seconds.

9. A process which comprises contacting a mixture comprising
   (a) cyclohexane,
   (b) an oxygen-containing gas, and
   (c) a small amount of dimethyldichlorosilane, with a catalyst comprising cupric oxide, at a temperature in the range of from about 250° C. to about 550° C., for a period of from about 0.1 second to about 5 seconds.

10. A process which comprises contacting a mixture comprising
    (a) cyclohexane,
    (b) an oxygen-containing gas, and
    (c) a small amount of phosphorus trichloride, with a catalyst comprising a mixture of silver oxide and an alkaline earth metal oxide, at a temperature in the range of from about 250° C. to about 550° C., for a period of from about 0.1 second to about 5 seconds.

11. A process which comprises contacting a mixture comprising
    (a) cyclohexane,
    (b) an oxygen-containing gas, and
    (c) a small amount of triethyl phosphite, with a catalyst comprising a mixture of silver oxide and an alkaline earth metal oxide, at a temperature in the range of from about 250° C. to about 550° C., for a period of from about 0.1 second to about 5 seconds.

References Cited in the file of this patent

UNITED STATES PATENTS

| | | |
|---|---|---|
| 2,377,083 | Kearby | May 29, 1945 |
| 2,661,380 | Orkin | Dec. 1, 1953 |
| 2,833,832 | Fox | May 6, 1958 |
| 2,847,475 | Voge et al. | Aug. 12, 1958 |